United States Patent
Lavender et al.

(10) Patent No.: US 12,457,198 B2
(45) Date of Patent: Oct. 28, 2025

(54) CONTROLLING ACCESS TO SECURE SYSTEMS BASED ON VIRTUAL PRIVATE NETWORK DETECTION

(71) Applicant: Bank of America Corporation, Charlotte, NC (US)

(72) Inventors: Laura Stillman Lavender, Washington, DC (US); Edward Lee Traywick, Bellbrook, OH (US); Christopher D. Nobile, Charlotte, NC (US); Joshua Johnson, Denver, NC (US); Nicholas O'Reilly, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 86 days.

(21) Appl. No.: 18/582,884

(22) Filed: Feb. 21, 2024

(65) Prior Publication Data

US 2025/0267126 A1   Aug. 21, 2025

(51) Int. Cl.
 H04L 9/40 (2022.01)
(52) U.S. Cl.
 CPC ........ H04L 63/0272 (2013.01); H04L 63/102 (2013.01); H04L 63/105 (2013.01)
(58) Field of Classification Search
 None
 See application file for complete search history.

(56) References Cited

U.S. PATENT DOCUMENTS

| | | | |
|---|---|---|---|
| 10,341,391 B1 | 7/2019 | Pandey et al. | |
| 10,404,735 B2 | 9/2019 | Jain | |
| 10,594,736 B1 | 3/2020 | Amit et al. | |
| 10,911,468 B2 | 2/2021 | Muddu et al. | |
| 2011/0167480 A1* | 7/2011 | Kumar | H04L 63/102 709/227 |
| 2011/0231910 A1* | 9/2011 | Mohanty | H04L 63/0272 726/6 |
| 2020/0404000 A1* | 12/2020 | Hayes | G06F 21/567 |
| 2023/0379304 A1* | 11/2023 | Niranjan | H04L 63/0236 |
| 2024/0007440 A1* | 1/2024 | Bhandari | H04L 63/0272 |
| 2024/0305453 A1* | 9/2024 | Alsahnawi | G06N 5/022 |

* cited by examiner

*Primary Examiner* — Raqiul A Choudhury
(74) *Attorney, Agent, or Firm* — Banner & Witcoff, Ltd.

(57) ABSTRACT

Arrangements for controlling access to secure resources when a VPN is detected. In some examples, a request to access an enterprise organization resource may be received by a computing platform and from a user computing device. The computing platform may determine whether a VPN is detected in the request. If not, the computing platform may enable a connection between the user computing device and the requested resource. If a VPN is detected, data may be extracted from the request. The data may include identification of a user, a type of VPN and/or a type of user computing device. The extracted data may be input to an AI/ML model and the model may be executed to generate a customized notification. The notification may indicate that use of a VPN has been detected and may provide customized instructions to disable the type of VPN detected.

20 Claims, 12 Drawing Sheets

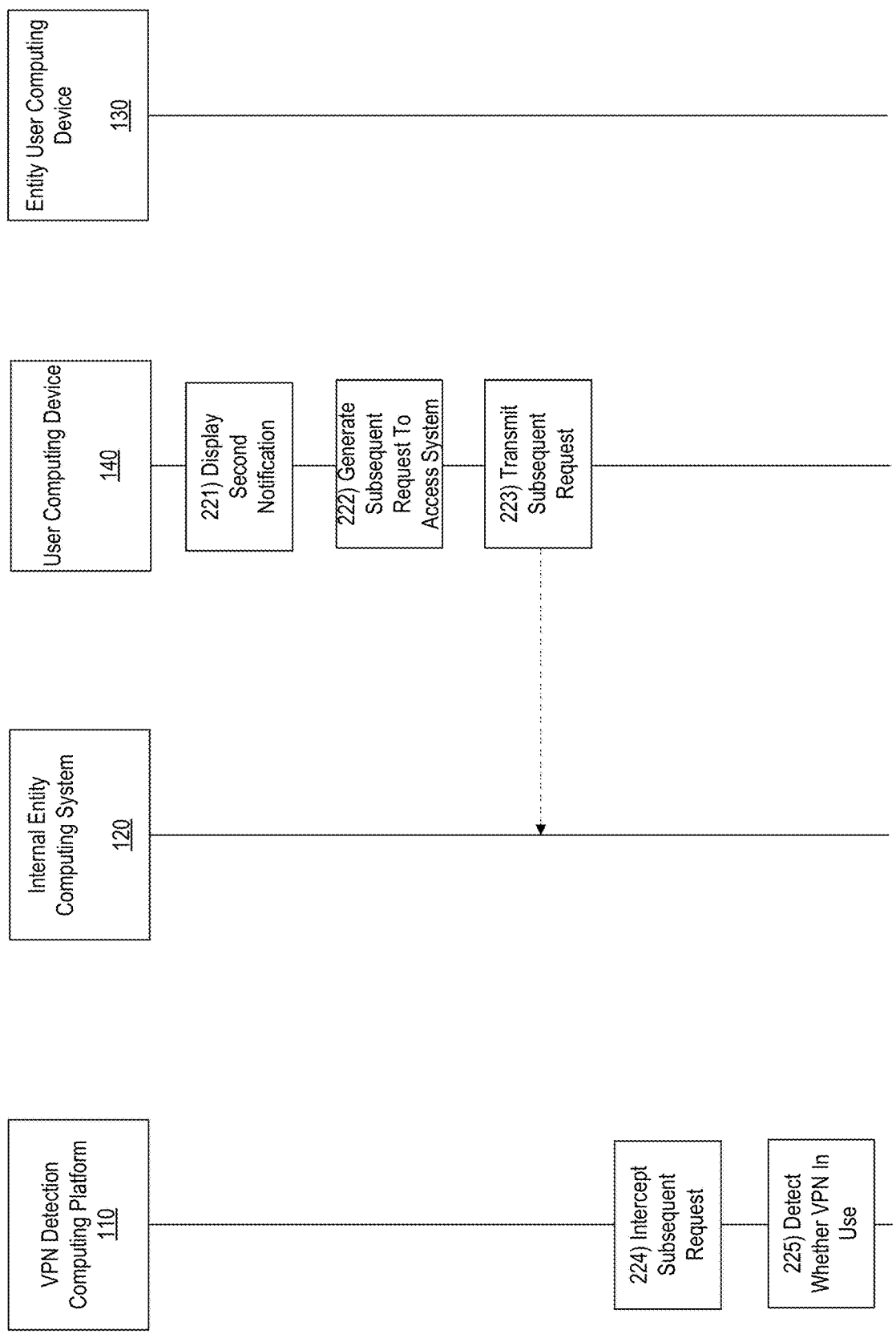

CONTROLLING ACCESS TO SECURE SYSTEMS BASED ON VIRTUAL PRIVATE NETWORK DETECTION

BACKGROUND

Aspects of the disclosure relate to controlling access to secure resources based on detection of a virtual private network (VPN).

Use of a VPN can be helpful in maintaining privacy and security of data. However, because a VPN can anonymize a user (e.g., by masking a location of a user), it can be difficult for an entity to confirm that a user logging in to access resources via a personal computing device (rather than a work-provided computing device) is actually a valid user. Accordingly, many enterprise organizations have a policy that does not permit users to access enterprise resources from a personal device when using a private VPN. However, enforcing this policy can be difficult and may require too many resources to be viable. In addition, many users are unaware of how to disable a VPN in order successfully access the enterprise resources. Accordingly, it would be advantageous to automatically detect use of a VPN when access is requested and inform users of the policy violation, as well as provide instructions for disabling the VPN in use.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated controlling access to secure resources when use of a VPN is detected.

In some examples, a request to access an enterprise organization resource may be received by a computing platform. The request may be received from a user computing device. The computing platform may determine whether a VPN is detected in the request for access. If not, the computing platform may enable a connection between the user computing device and the requested resource. If a VPN is detected, data may be extracted from the request. The data may include identification of a user, a type of VPN and/or a type of user computing device.

In some examples, the extracted data may be input to an artificial intelligence/machine learning (AI/ML) model and the model may be executed to generate a customized notification. The notification may indicate that use of a VPN has been detected when accessing a particular resource and may provide customized instructions to disable the type of VPN detected. The notification may then be transmitted to the user computing device and displayed.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2F depict an illustrative event sequence for controlling access to secure systems based on VPN detection in accordance with one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, use a VPN when a user is attempting to access work resources via a personal computing device can make it difficult to confirm the validity of the user or identify potential threat actors. Accordingly, many enterprise organizations do not permit use of a VPN to access enterprise organization resources from personal devices. However, controlling access when a VPN is detected can be difficult.

Accordingly, aspects described herein provide for detection of a VPN when a user submits a request to access an enterprise organization resource. Upon detection of the VPN, data may be extracted from the request for access, such as a user identity, type of VPN, type of user computing device (e.g., type of device (e.g., mobile device, desktop device or the like), manufacturer of the device, operating system of the device, or the like), and the like. The extracted data may be input to an AI model to output or generate a customized notification indicating that a VPN was detected and providing instructions for disabling the VPN.

These and various other arrangements will be discussed more fully below.

Figure 1A:
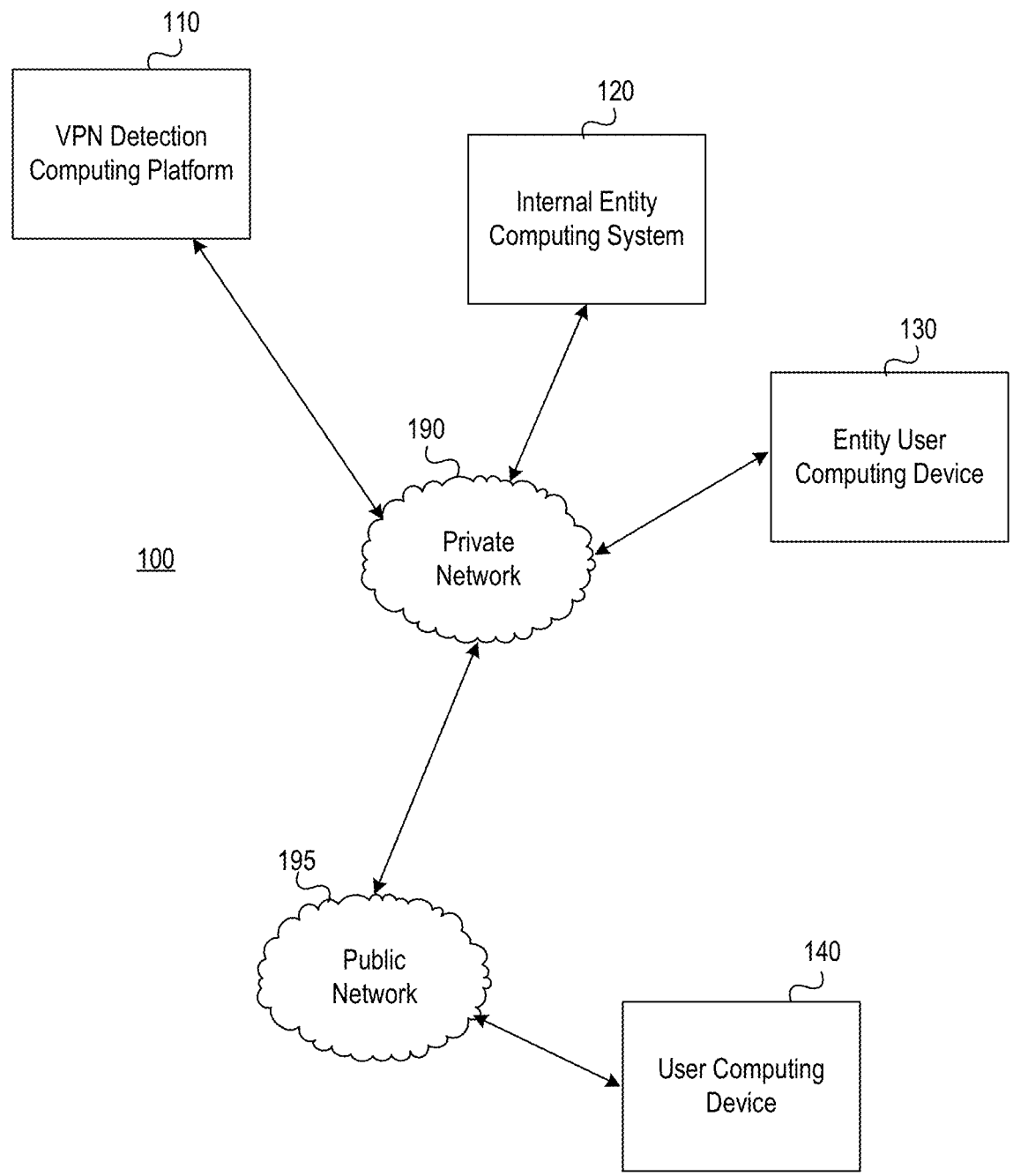
FIGS. 1A-1B depict an illustrative computing environment for controlling access to secure systems based on VPN detection in accordance with one or more aspects described herein.
Figure 1B:
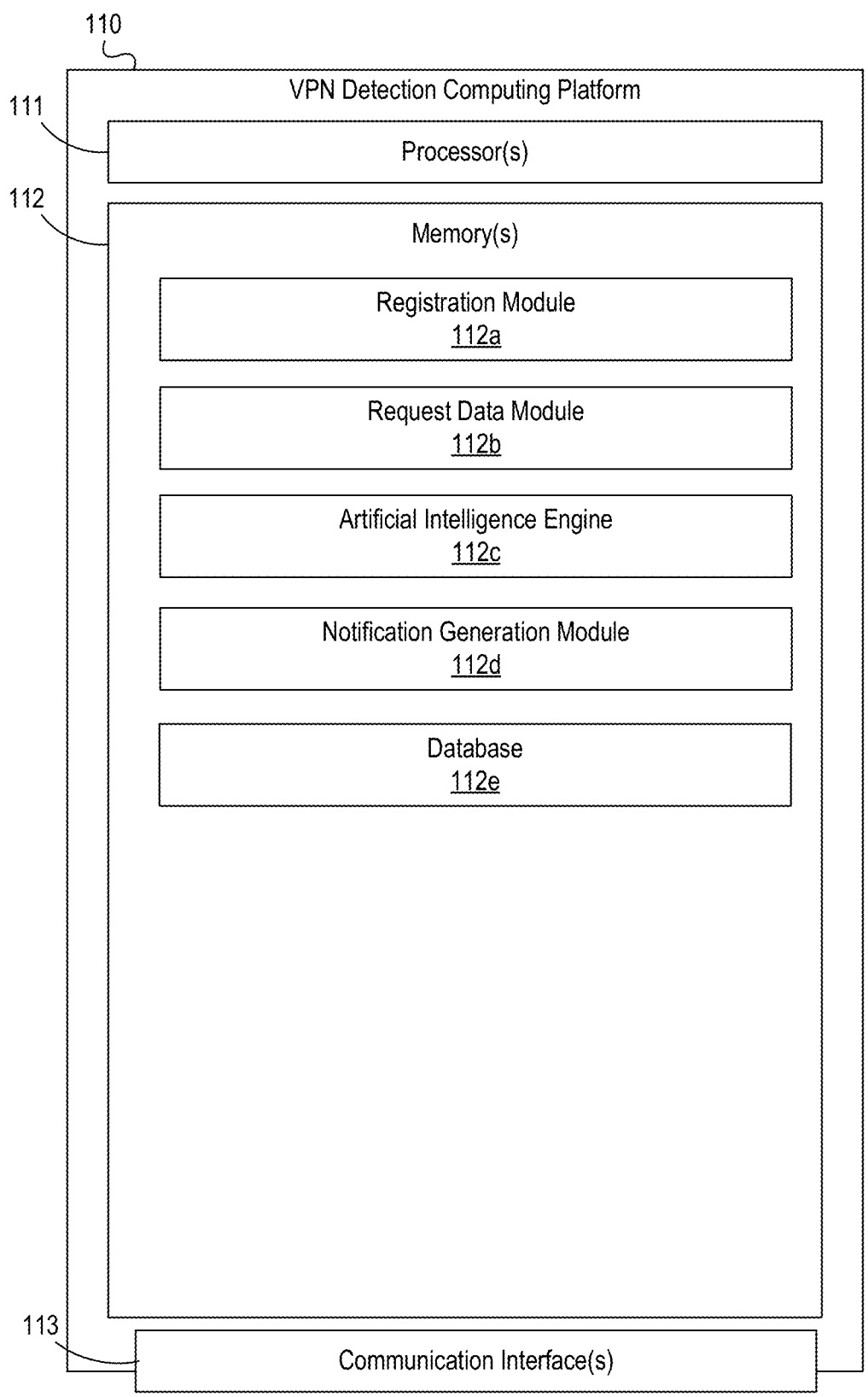

FIGS. 1A-1B depict an illustrative computing environment for implementing processes for detecting use of a virtual private network (VPN) in accordance with one or more aspects described herein. Referring to FIG. 1A, computing environment 100 may include one or more computing devices and/or other computing systems. For example, computing environment 100 may include VPN detection computing platform 110, internal entity computing system 120, entity user computing device 130, and user computing device 140. Although one internal entity computing system 120, one entity user computing device 130 and one user computing device 140 are shown, any number of systems or devices may be used without departing from the invention.

VPN detection computing platform 110 may be or include one or more computing devices (e.g., servers, server blades, or the like) and/or one or more computing components (e.g., memory, processor, and the like) and may be configured to provide dynamic, efficient, intelligent detection of VPN use and customized notifications to users for disabling a VPN. For instance, VPN detection computing platform 110 may receive or intercept a request, from a user computing device such as user computing device 140, to access a resource, such as a system, application, or the like, of an enterprise organization (e.g., a system or application executing on or hosted by internal entity computing system 120). In response to receiving or intercepting the request, VPN detection computing platform 110 may determine whether a VPN is in use by the user (e.g., that the request to access the resource has an intermediary between the user device and the network). If so, in some examples, that may be a policy violation for the enterprise organization because the user of the VPN may mask a physical location of the user which may make it difficult for the enterprise organization to confirm the validity of the user making the request. Accordingly, the enterprise organization might not permit access to organization resources when a VPN is in use.

If a VPN is detected, details of the request for access, such as a type of VPN in use, a type of computing device, and the like, may be extracted from the request. The type of VPN and type of computing device may be used as inputs to an AI model that, when executed, may output content for a customized notification for the user. For instance, a generative AI model may be trained using historical data and executed, using inputs from a current request, to output a customized notification indicating that the user request to access resources is not permitted because a VPN is in use. The notification may also include instructions to disable the VPN that are particular to the type of device, type of VPN, and the like. In some examples, a skill level of the user may be determined (e.g., based on a job code or role of the user within the enterprise organization, based on historical data of the user, or the like). In some examples, the skill level may be used as an input to the AI model to enable further customization of the instructions for disabling the VPN. For instance, if a user has a high skill level, that may indicate the user is tech savvy and the instructions may be tailored to that type of user. Whereas, if the user has a low skill level, the user might not be very tech savvy and, accordingly, the instructions may be more basic or detailed in order to ensure they can be easily followed by the user.

The output from the AI model may be used to generate a user interface that may be displayed to the user. In some examples, the user interface may include one or more dynamic elements that highlight, overlay or identify different options, settings, or the like, on the user's browser or other application page to provide further instruction to the user to disable the VPN.

Any subsequent requests to access the resource may be further evaluated to determine whether a VPN is detected. If not (e.g., if a VPN is not in use or the user disabled the VPN based on an earlier notification) the user may be permitted to access the resource. If a VPN is still detected, additional notifications and/or escalation may be generated. In some examples, the customized notification may include reminders of previous attempts to access the resource with a VPN enabled. In some examples, escalation may include generating and transmitting a notification to an entity computing device (such as entity user computing device 130) that may identify the user, the issue identified (e.g., repeated attempts to access a resource with VPN enabled), and the like.

Internal entity computing system 120 may be or include one or more computing devices (e.g., servers, server blades, or the like) and/or one or more computing components (e.g., memory, processor, and the like. Internal entity computing system 120 may host or execute one or more applications, systems, or the like, used by the enterprise organization (e.g., internal applications used during the normal course of business, client-side applications, and the like). Access to the systems or applications hosted by the internal entity computing system 120 may be available to users (e.g., employees of the enterprise organization, customers of the enterprise organization, or the like) via a user computing device, such as user computing device 140.

Entity user computing device 130 may be or include one or more computing devices, such as laptop computers, tablet computers, smart phones, wearable devices, and the like. In some examples, entity user computing device 130 may be associated with an employee of the enterprise organization who may be an administrator, cyber threat detection specialist or the like. In some examples, entity user computing device 130 may be used to receive and display notifications of users using VPN, other policy violations, and the like, and/or may be used to facilitate any escalation processes for users who continue to attempt to access resources using a VPN.

User computing device 140 may be or include one or more computing devices, such as laptop computers, tablet computers, smart phones, wearable devices, and the like. In some examples, user computing device 140 may be a personal computing device of a user (e.g., a non-work issued computing device of an employee of the enterprise organization). User computing device 140 may be used to access one or more resources of the enterprise organization pursuant to enterprise organization policy.

As mentioned above, computing environment 100 also may include one or more networks, which may interconnect one or more of VPN detection computing platform 110, internal entity computing system 120, entity user computing device 130, and/or user computing device 140. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, VPN detection computing platform 110, internal entity computing system 120, and/or entity user computing device 130 may be associated with an enterprise organization (e.g., a financial institution), and private network 190 may be associated with and/or operated by the organization, and may include one or more networks (e.g., LANs, WANs, virtual private networks (VPNs), or the like) that interconnect VPN detection computing platform 110, internal entity computing system 120, and/or entity user computing device 130 and one or more other computing devices and/or computer systems that are used by, operated by, and/or otherwise associated with the organization. Public network 195 may connect private network 190 and/or one or more computing devices connected thereto (e.g., VPN detection computing platform 110, internal entity computing system 120, and/or entity user computing device 130) with one or more networks and/or computing devices that are not associated with the organization. For example, user computing device 140 might not be associated with an organization that operates private network 190 (e.g., because user computing device 140 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect user computing device 140 to private network 190 and/or one or more computing devices connected thereto (e.g., VPN detection computing platform 110, internal entity computing system 120, and/or entity user computing device 130).

Referring to FIG. 1B, VPN detection computing platform 110 may include one or more processors 111, memory 112, and communication interface 113. A data bus may interconnect processor(s) 111, memory 112, and communication interface 113. Communication interface 113 may be a network interface configured to support communication between VPN detection computing platform 110 and one or more networks (e.g., network 190, network 195, or the like). Memory 112 may include one or more program modules having instructions that when executed by processor(s) 111 cause VPN detection computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of VPN detection computing platform 110 and/or by different computing devices that may form and/or otherwise make up VPN detection computing platform 110.

For example, memory 112 may have, store and/or include registration module 112a. Registration module 112a may store instructions and/or data that may cause or enable the VPN detection computing platform 110 to receive registration data from an enterprise organization and identifying a plurality of users (e.g., employees of the enterprise organization, customers of the enterprise organization, and the like). In some examples, the registration data may be received from a database storing employee identifying information, authentication data of a employees (e.g., authentication credentials to access enterprise organization systems), location data for employees (e.g., expected or "home" location of each employee), and the like. In some examples, the registration data may include a determined skill level of each employee that indicates how technologically savvy each employee is. For instance, each employee may have a job code associated with a role of the employee. The job codes may be classified into different skill levels based on type of work (e.g., a person working in information technology support is likely very technologically savvy while a person working in a non-IT related job may be less tech savvy, and the like). In some examples, three skill levels may be used (e.g., 1, 2, 3). Various other numbers of skill levels may be used without departing from the invention. In this example, each job code may be associated with a skill level of 1 (role is likely most technologically savvy), 2 (role is likely less technologically savvy), 3 (role is likely low technology expertise). While users may vary within each skill level, the skill level may be used to generate a customized notification including instructions for disabling a particular VPN being used by the user and may provide more detailed instructions for users at skill level 3 than for users at skill level 1 who may require little in the way of instruction. The identified skill level may be associated with each employee and may be stored, for instance, in database 112e.

VPN detection computing platform 110 may further have, store and/or include request data module 112b. Request data module 112b may store instructions and/or data that may cause or enable VPN detection computing platform 110 to receive requests from user computing devices to access enterprise organization resources (e.g., via internal entity computing system 120 and extract data from the request. For instance, request data module 112b may evaluate the request to determine whether a VPN is being used by the user computing device. If so, data related to a type of VPN being used, a type of user computing device being used, and the like, may be extracted from the request data.

VPN detection computing platform 110 may further have, store and/or include artificial intelligence engine 112c. Artificial intelligence engine 112c may store instructions and/or data that may cause or enable the VPN detection computing platform 110 to train, execute and/or update or validate one or more artificial intelligence/machine learning (AI/ML) models to receive, as inputs, data extracted from access requests and generate or output a customized notification including instructions to disable a VPN of a particular type.

In some examples, the AI/ML model may be a generative AI model trained using supervised learning or self-supervised learning based on publicly available data as well as data from the enterprise organization. For instance, the AI/ML model may be trained using historical data related to previous user attempts to access resources when using a VPN, user responses to instructions to disable a VPN, and the like. In some examples, this may be labeled data used to train the model. Further the AI/ML model may be trained using publicly available data associated with different types of VPNs, different types of computing devices, and the like. For instance, instructions to disable one or more particular types of VPN, instructions to navigate screens or interfaces on particular user computing devices or particular operating systems, and the like may generally be publicly available information and this information may be used to train the AI/ML model to generate a customized notification to a user including instructions to disable the particular type of VPN in use by the user and based on the particular type of computing device being used by the user.

In some examples, the machine learning model may be or include one or more supervised learning models (e.g., decision trees, bagging, boosting, random forest, neural networks, linear regression, artificial neural networks, logical regression, support vector machines, and/or other models), unsupervised learning models (e.g., clustering, anomaly detection, artificial neural networks, and/or other models), knowledge graphs, simulated annealing algorithms, hybrid quantum computing models, and/or other models. In some examples, training the machine learning model may include training the model using labeled data (e.g., labeled data including VPN use, notifications sent, actions taken, and the like) and/or unlabeled data.

Accordingly, the artificial intelligence engine 112c may receive, as inputs to the model, the particular type of VPN in a request, type of user computing device, and the like, to output the customized notification. In some examples, additional inputs such as history of user attempts to access resources when using a VPN, previous notifications and/or instructions sent to the user, skill level identified for the user, and the like, may be provided to the model to generate or output the notification.

VPN detection computing platform 110 may further have, store, and/or include notification generation module 112d. Notification generation module 112d may store instructions and/or data that may cause or enable the VPN detection computing platform 110 to generate one or more user interfaces including the notification and/or instructions generated or output by the AI/ML model. For instance, one or more user interfaces including customized information for the user may be generated. In some examples, the user interface may include one or more interactive or animated icons or elements to identify particular features, settings or options for the user to select in order to disable the VPN.

VPN detection computing platform 110 may further have, store and/or include database 112e. Database 112e may store data related to employee registration information, employee skill level, history of access attempts, history of notifications generated and/or other data that enables performance of aspects described herein by the VPN detection computing platform 110.

FIGS. 2A-2F depict one example illustrative event sequence for VPN detection in accordance with one or more aspects described herein. The events shown in the illustrative event sequence are merely one example sequence and additional events may be added, or events may be omitted, without departing from the invention. Further, one or more processes discussed with respect to FIGS. 2A-2F may be performed in real-time or near real-time.

Figure 2A:
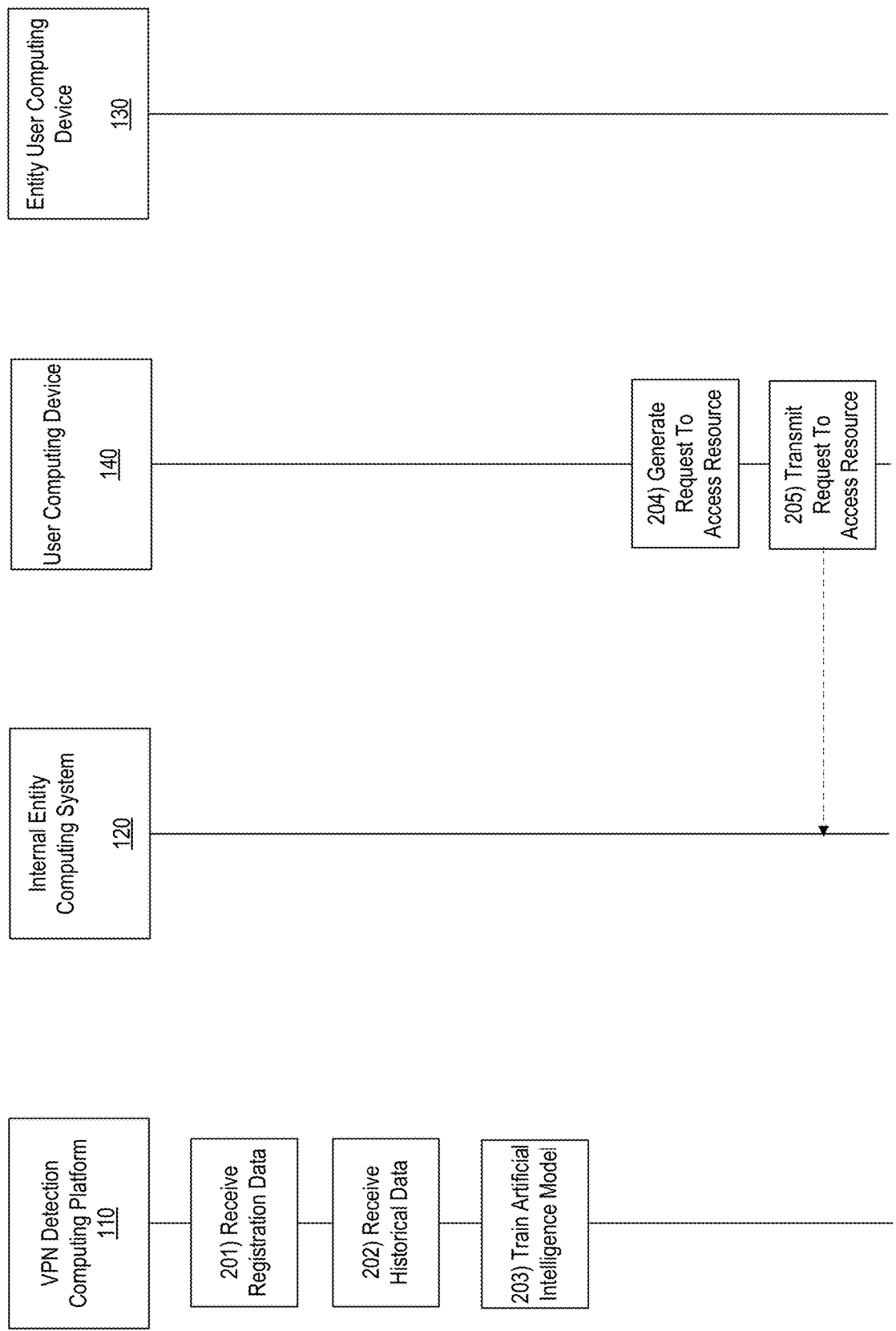

With reference to FIG. 2A, at step 201, VPN detection computing platform 110 may receive registration data. For instance, VPN detection computing platform 110 may receive registration data related to employees of the enterprise organization, authentication data or credentials of the employees (e.g., to identify employees upon receive a request to access a resource), job code or role within the enterprise organization, skill level, and the like.

At step 202, VPN detection computing platform 110 may receive historical and/or publicly available data. For instance, data related to attempts to access resources when using a VPN, instructions to disable various types of VPNs, interfaces and/or operating systems of different types of computing devices, and the like, may be received and/or retrieved.

At step 203, the VPN detection computing platform 110 may train an AI/ML model to generate customized notifications providing instructions to disable a VPN. For instance, the received historical and/or publicly available data may be used to train the AI/ML model to receive, as inputs, a type of VPN, a type of computing device, and the like, an output or generate a customized notification to a user identifying the issue (e.g., there is a policy violation because you are attempting to access enterprise organization resources when using a VPN) and/or providing instructions to disable the VPN before attempting another access request. In some examples, the model may be trained to receive additional inputs such as a name of a user, history of user attempts to access resources when using a VPN, history of notifications sent to the user, skill level of the user, and the like, to generate or output the customized notification.

At step 204, user computing device 140 may generate a request to access a resource of the enterprise organization. For instance, a user may attempt to login to a system or application associated with the enterprise organization via user computing device 140. In some examples, the user may provide authentication data or credentials, which may be used to identify a user.

At step 205, user computing device 140 may transmit or send the request to access the resource to the internal entity computing system 120.

Figure 2B:
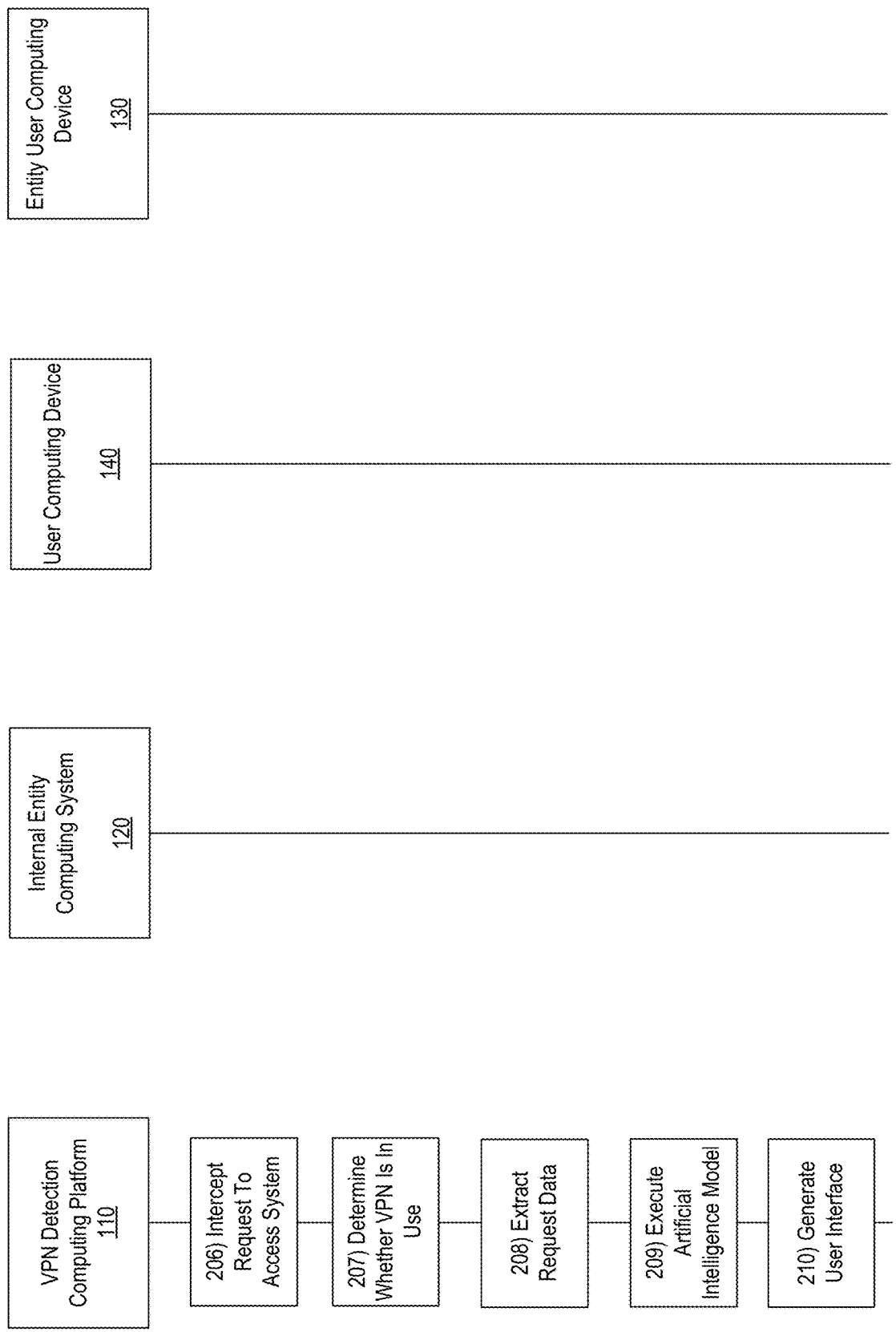

With reference to FIG. 2B, at step 206, the VPN detection computing platform 110 may intercept the request to access the resource. For instance, in some examples, custom software, similar to a browser extension, may be used to redirect the request to access the resource to the VPN detection computing platform 110 to ensure compliance with enterprise organization policies and requirements.

At step 207, VPN detection computing platform 110 may determine whether a VPN in in use in the request to access the resource. For instance, an internet protocol (IP) address matching a known VPN may be detected in the request to access the resource, which may indicate a VPN is in use. In another example, VPN detection computing platform 110 may detect an intermediary between the user computing device 140 and the VPN detection computing platform 110 or the internal entity computing system 120 (e.g., an extra "hop" in data transmission), which may indicate use of a VPN.

Figure 2C:
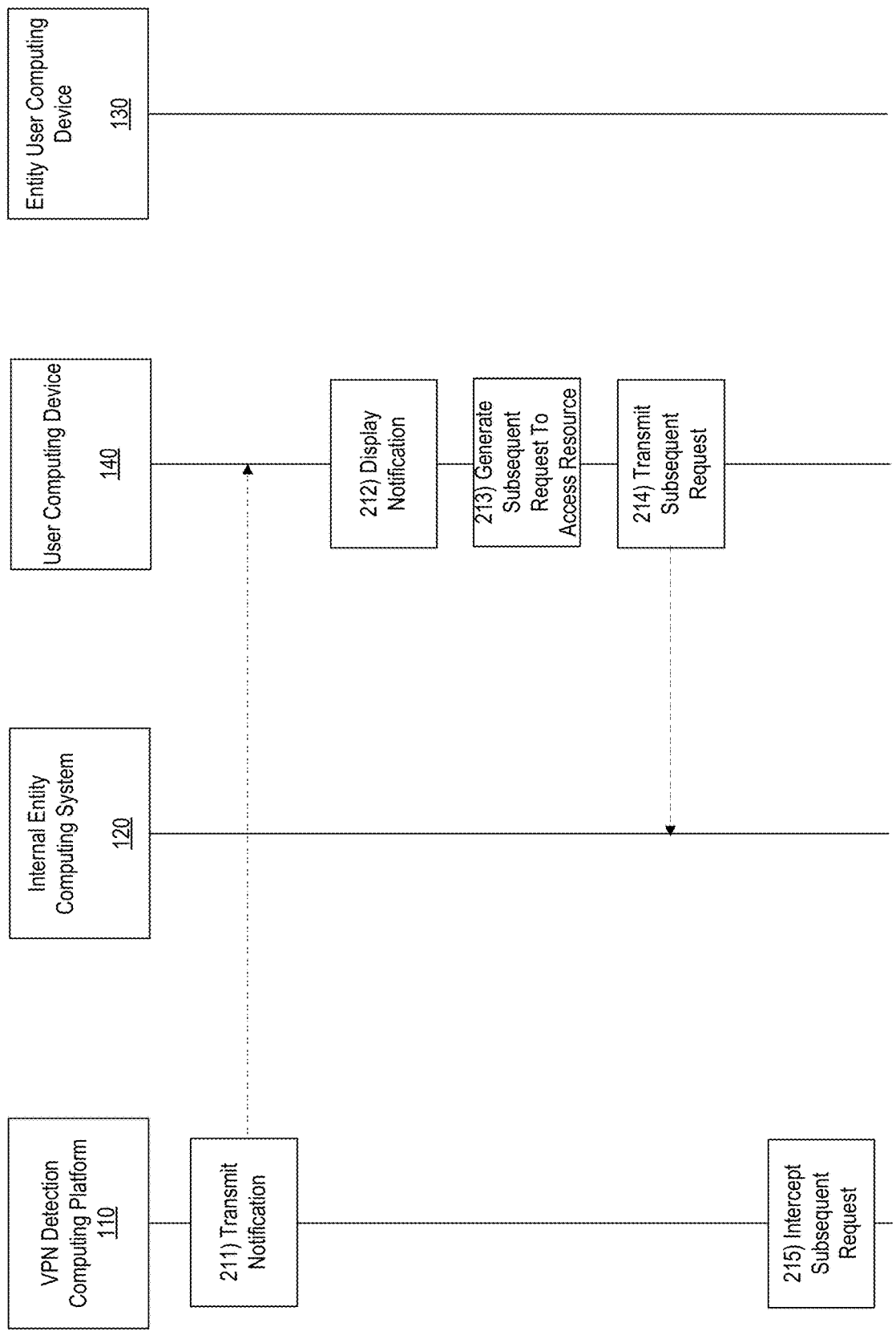
Figure 2D:
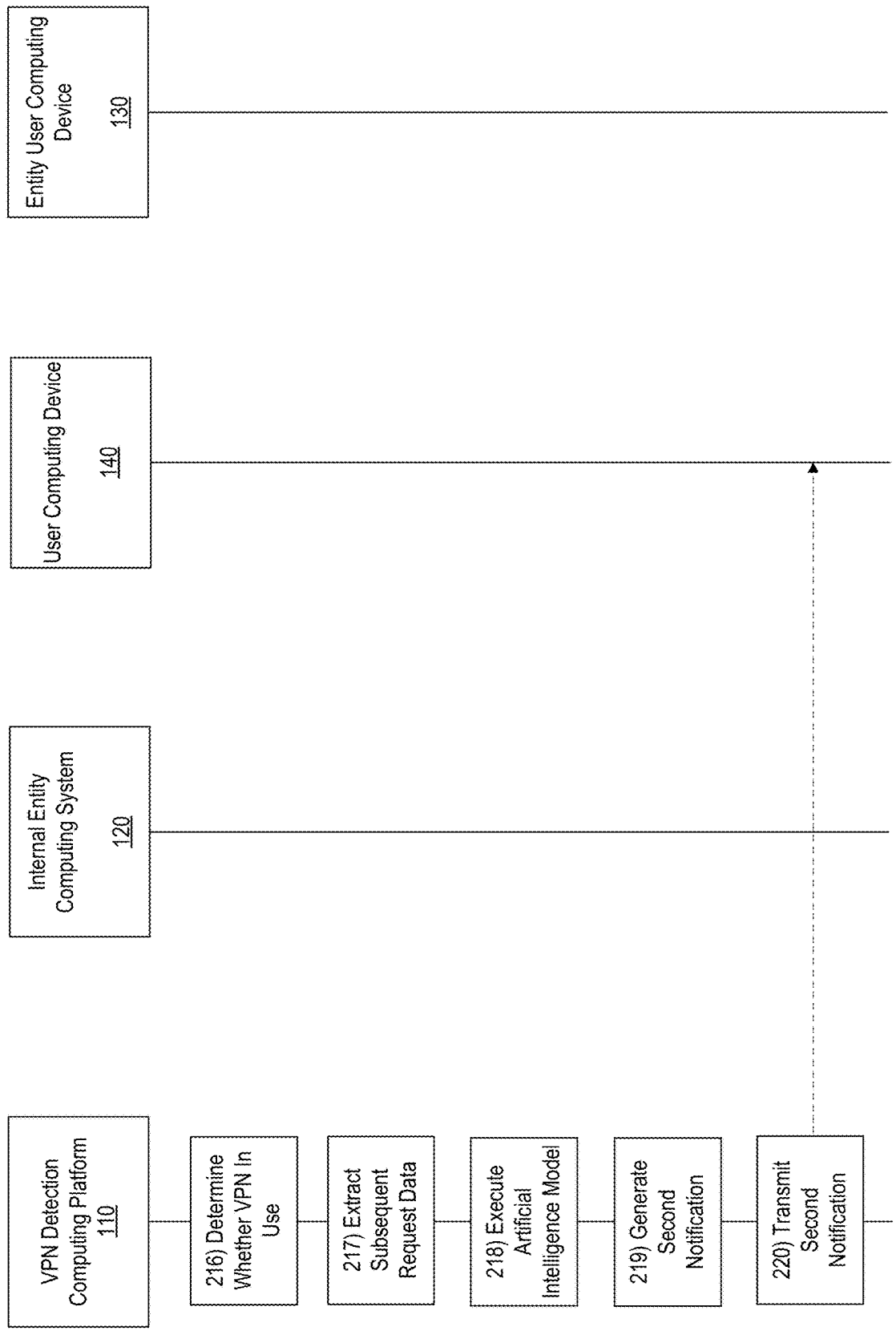
Figure 2F:
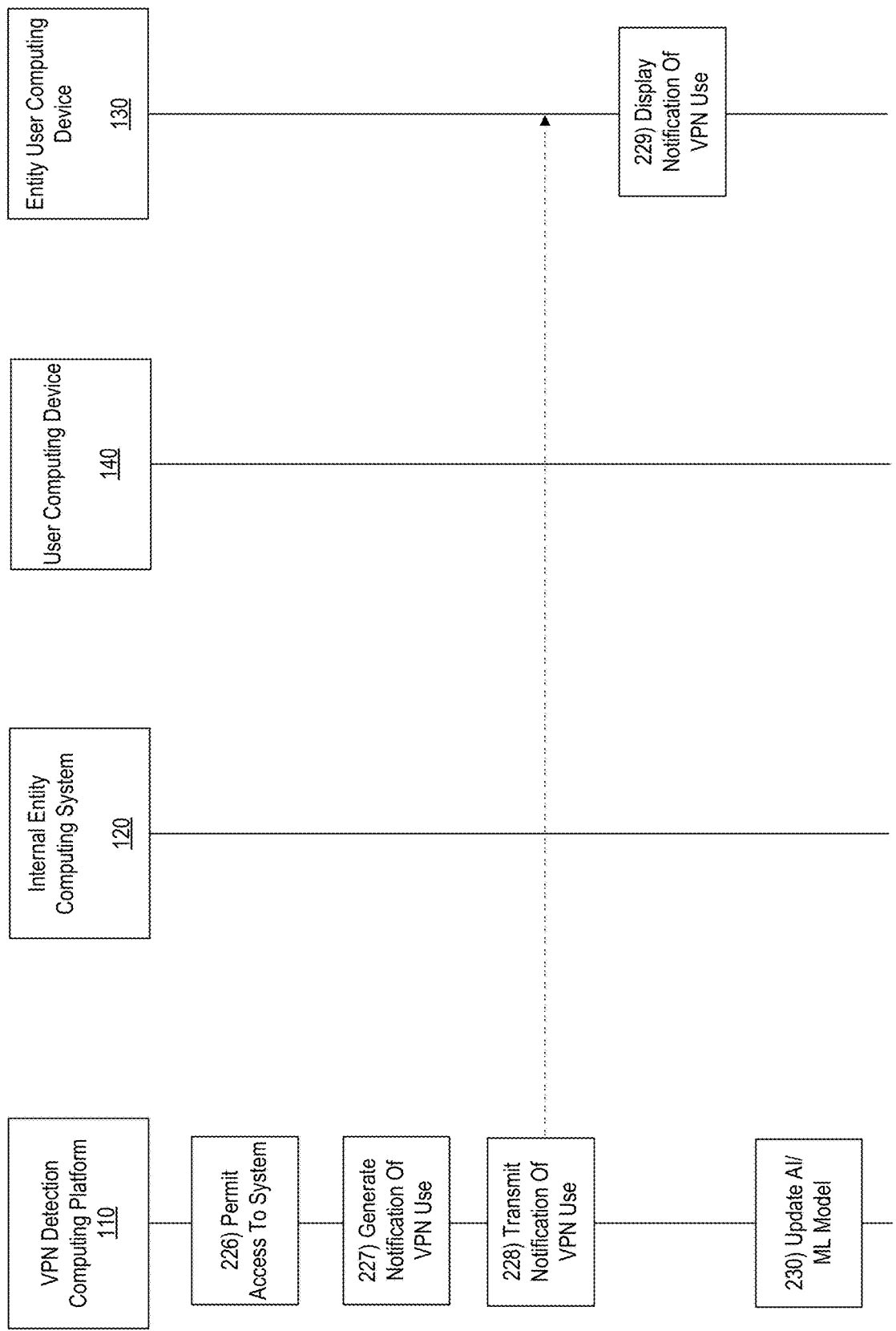

If, at step 207, a VPN is not in use, the process may proceed to step 226 in FIG. 2F and permit access to the internal entity computing system 120 (e.g., enable a network connection and communication between user computing device 140 and internal entity computing system 120).

If, at step 207, a VPN is detected, at step 208, VPN detection computing platform 110 may extract data from the request to access the resource. For instance, a type of VPN in use, a type of user computing device from which the request was received, user identification or credential data, and the like, may be extracted from the request to access the resource.

At step 209, the VPN detection computing platform 110 may execute the AI model. For instance, VPN detection computing platform 110 may provide, as inputs to the model, the type of VPN, type of user computing device, user identifying information, and the like. The model may be executed to generate or output a customized notification indicating that the user is using a VPN which is a violation of enterprise organization policy and may provide detailed instructions to disable the VPN (e.g., customize to the type of VPN and type of computing device) prior to attempting to access the resource again. In some examples, additional inputs such as skill level of the user, history of VPN use, and the like, may be used in generating or outputting the customized notification.

Figure 4:
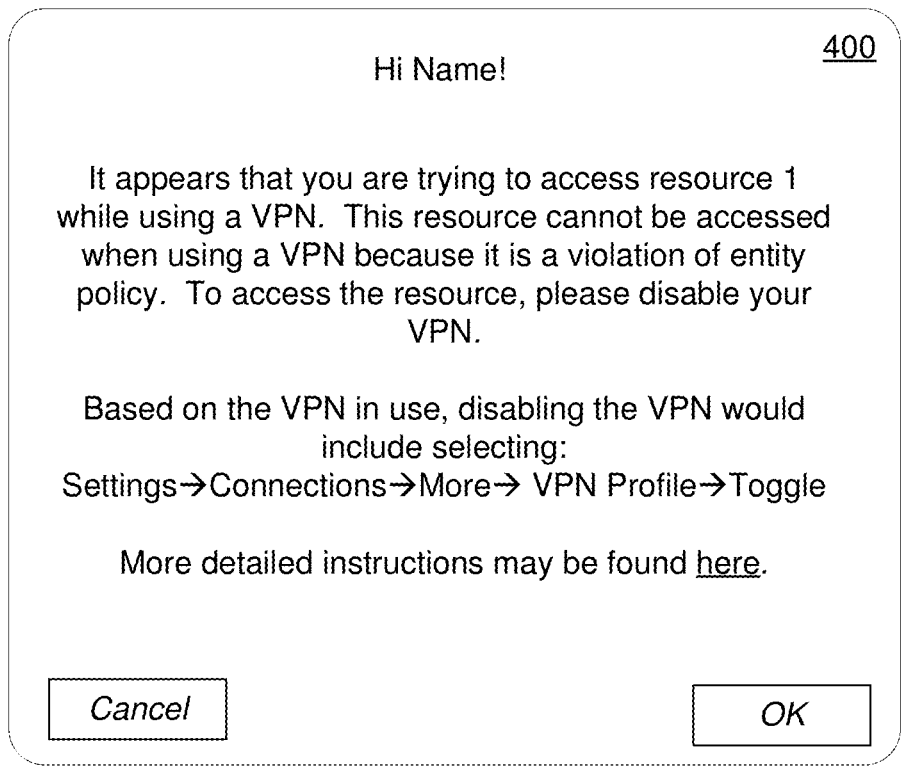
FIGS. 4-6 illustrate example graphical user interfaces that may be generated in accordance with one or more aspects described herein.

At step 210, VPN detection computing platform 110 may generate a user interface including the notification output by the AI model. For instance, the user interface may include identification of the issue, as well as the generated, customized instructions for disabling the VPN. FIG. 4 illustrates one example user interface 400 including a customized greeting for the user (e.g., "Hi Name"). The notification or user interface 400 may also include identification of the resource the user is requesting to access, as well as a reason why the access is not permitted (e.g., violation of enterprise organization policy). The notification or user interface 400 may further include instructions to disable the VPN. The instructions may be customized to the particular type of VPN being used by the user in this particular instance of request for access. In some arrangements, a selectable link to additional information or instructions may also be provided. In some examples, one or more animated icons or interface elements may be used as an overlay on the user computing device to identify selectable options to aid in navigating the user through the steps of disabling the VPN. Various other information may be provided without departing from the invention.

With reference to FIG. 2C, at step 211, VPN detection computing platform 110 may transmit or send the generated user interface including the notification output by the AI/ML model to the user computing device 140. In some examples, transmitting or sending the user interface may cause the user computing device 140 to display the user interface on a display of the user computing device 140.

At step 212, user computing device 140 may receive and display the user interface transmitted at step 211.

At step 213, user computing device 140 may generate a second or subsequent request to access a resource of the enterprise organization. For instance, user input (e.g., including user credentials) may be received in a request to access an enterprise organization resource, which may cause the user computing device 140 to generate a request. In some examples, it may be the same resource for which access was requested at step 204. In other examples, it may be a different resource (e.g., a different application or system of the enterprise organization).

At step 214, user computing device 140 may transmit or send the second or subsequent request to access the resource to the internal entity computing system 120.

At step 215, the VPN detection computing platform 110 may intercept the second or subsequent request to access the resource. For instance, in some examples, custom software, similar to a browser extension, may be used to redirect the second or subsequent request to access the resource to the VPN detection computing platform 110 to ensure compliance with enterprise organization policies and requirements.

With reference to FIG. 2D, at step 216, VPN detection computing platform 110 may determine whether a VPN is in use in the second or subsequent request to access the resource. For instance, an internet protocol (IP) address matching a known VPN may be detected in the request to access the resource, which may indicate a VPN is in use. In another example, VPN detection computing platform 110 may detect an intermediary between the user computing device 140 and the VPN detection computing platform 110 or the internal entity computing system 120 (e.g., an extra "hop" in data transmission), which may indicate use of a VPN.

If, at step 216, a VPN is not in use, the process may proceed to step 226 in FIG. 2F and permit access to the internal entity computing system 120 (e.g., enable a network connection and communication between user computing device 140 and internal entity computing system 120).

If, at step 215, a VPN is detected, at step 217, VPN detection computing platform 110 may extract data from the second or subsequent request to access the resource. For instance, a type of VPN in use, a type of user computing device from which the request was received, user identification or credential data, and the like, may be extracted from the second or subsequent request to access the resource.

At step 218, the VPN detection computing platform 110 may execute the AI model. For instance, VPN detection computing platform 110 may provide, as inputs to the model, the type of VPN, type of user computing device, user identifying information, and the like extracted from the second or subsequent request. The model may be executed to generate or output a customized notification indicating that the user is using a VPN which is a violation of enterprise organization policy and may provide detailed instructions to disable the VPN (e.g., customize to the type of VPN and type of computing device) prior to attempting to access the resource again. In some examples, additional inputs such as skill level of the user, history of VPN use (e.g., notification generated in response to request made at step 204 or the like), and the like, may be used in generating or outputting the customized notification.

Figure 5:
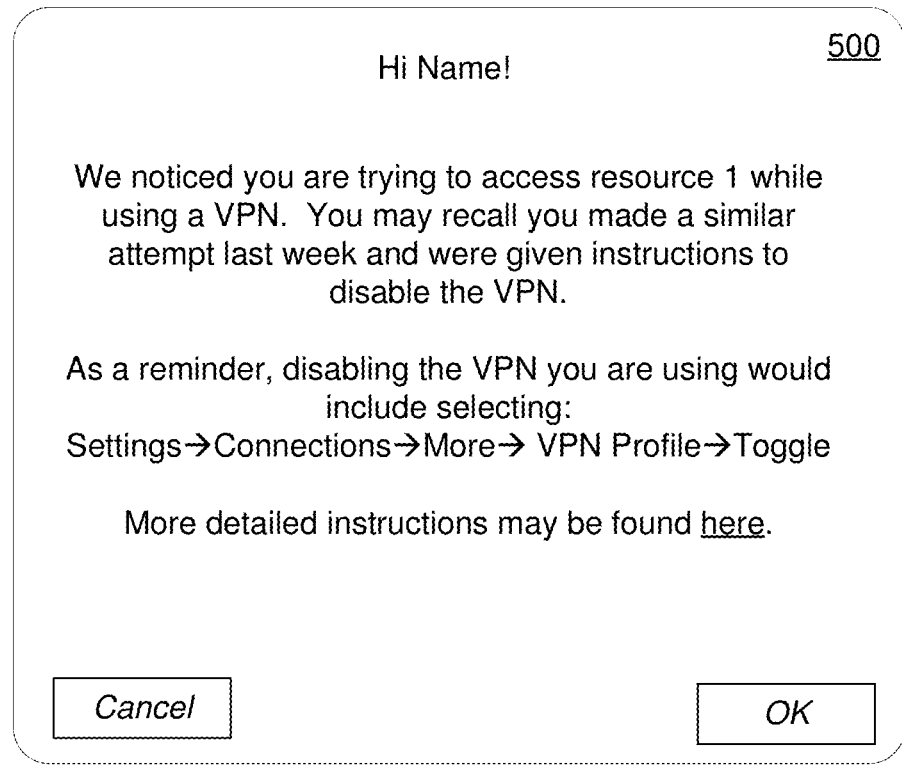

At step 219, VPN detection computing platform 110 may generate a user interface including the notification output by the AI model using the data from the second or subsequent request as inputs. For instance, the user interface may include identification of the issue, as well as the generated, customized instructions for disabling the VPN. FIG. 5 illustrates one example user interface 500 including customized information that not only identifies the issue but also references earlier attempts to access the resource using a VPN. For instance, the notification or user interface 500 may include a personalized greeting of the user (e.g., "Hi Name!") and a reminder that the user made a similar attempt last week. The instructions to disable the VPN may also be provided and may, again, be specific to the type of VPN being used in this instance. A selectable link to additional instructions or information may also be provided. Various other information may be provided without departing from the invention.

At step 220, VPN detection computing platform 110 may transmit or send the generated user interface including the notification output by the AI/ML model to the user computing device 140. In some examples, transmitting or sending the user interface may cause the user computing device 140 to display the user interface on a display of the user computing device 140.

With reference to FIG. 2E, at step 221, user computing device 140 may receive and display the user interface transmitted at step 220.

At step 222, user computing device 140 may generate a third or subsequent request to access a resource of the enterprise organization. For instance, user input (e.g., including user credentials) may be received in a request to access an enterprise organization resource, which may cause the user computing device 140 to generate a request. In some examples, it may be the same resource for which access was requested at step 204 and/or step 213. In other examples, it may be a different resource (e.g., a different application or system of the enterprise organization).

At step 223, user computing device 140 may transmit or send the third or subsequent request to access the resource to the internal entity computing system 120.

At step 224, the VPN detection computing platform 110 may intercept the third or subsequent request to access the resource. For instance, in some examples, custom software, similar to a browser extension, may be used to redirect the second or subsequent request to access the resource to the VPN detection computing platform 110 to ensure compliance with enterprise organization policies and requirements.

At step 225, VPN detection computing platform 110 may determine whether a VPN is in use in the third or subsequent request to access the resource, similar to the evaluation performed at steps 207 and/or 216.

If, at step 225, a VPN is not in use, the process may proceed to step 226 in FIG. 2F and permit access to the internal entity computing system 120 (e.g., enable a network connection and communication between user computing device 140 and internal entity computing system 120). If, at step 225, a VPN is in use, the process may continue to extract data from the request and execute the AI model to generate additional notifications.

Figure 6:
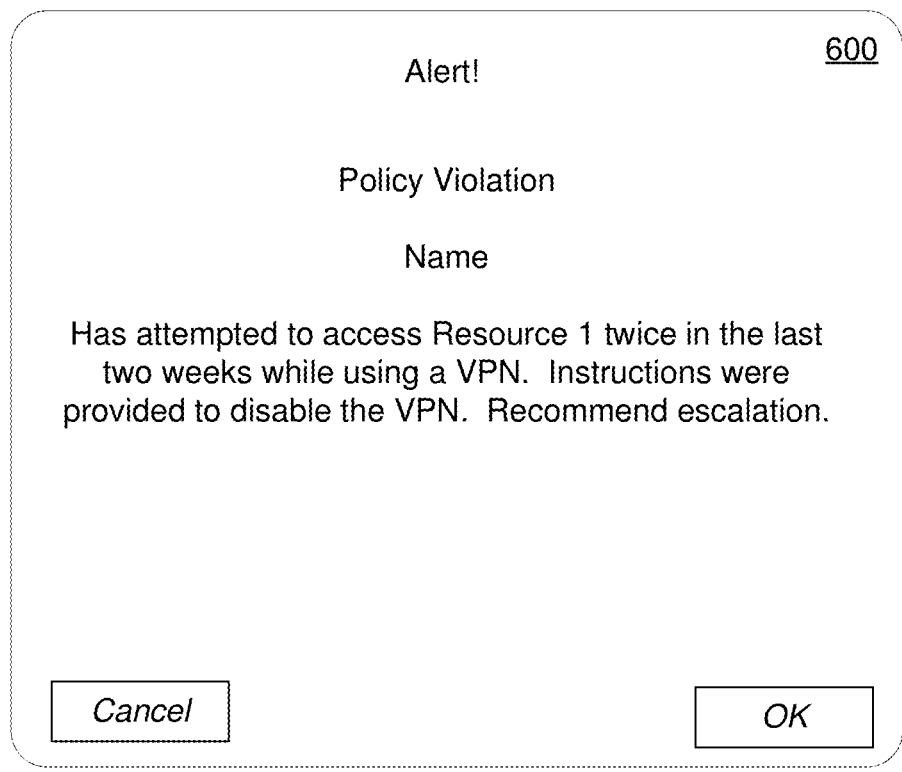

At step 227, VPN detection computing platform 110 may generate one or more notifications indicating the one or more attempts to access resources while using a VPN. In some examples, the notification may include identification of the user who attempted to access the resource while using a VPN, a number of times the user attempted access, and the like. In some arrangements, upon meeting at least a threshold number of attempts to access a resource while using a VPN, the issue may be escalated and recommended escalation may be included in the generated notification. FIG. 6 illustrates one example notification 600 that may be generated. The notification may include an alert that identifies the user that attempted to access the resource via the VPN, a number of times and a time frame in which the attempts were made, as well as a recommendation for escalation. Various other information may be provided without departing from the invention.

At step 228, VPN detection computing platform 110 may transmit or send the notification generated at step 227 to an entity computing device, such as entity user computing device 130. In some examples, transmitting or sending the notification may cause the entity user computing device 130 to display the notification on a display of the entity user computing device 130.

At step 229, entity user computing device 130 may receive and display the notification.

At step 230, the VPN detection computing platform 110 may update or validate the AI/ML model. For instance, based on the one or more requests to access resource(s), the one or more notifications generated, and the like, the AI/ML model may be updated or validated (e.g., via a dynamic feedback loop) to continuously improve accuracy of generated notifications.

In some instances, VPN detection computing platform 110 may continuously update, validate, refine, or the like, the AI/ML model. In some examples, the VPN detection computing platform 110 may maintain an accuracy threshold for the AI/ML model and may pause refinement (through the dynamic feedback loop) of the model if the corresponding accuracy is identified as greater than the accuracy threshold. Further, if the accuracy is at or below the accuracy threshold, the VPN detection computing platform 110 may resume refinement of the model through the corresponding dynamic feedback loop.

Figure 3:
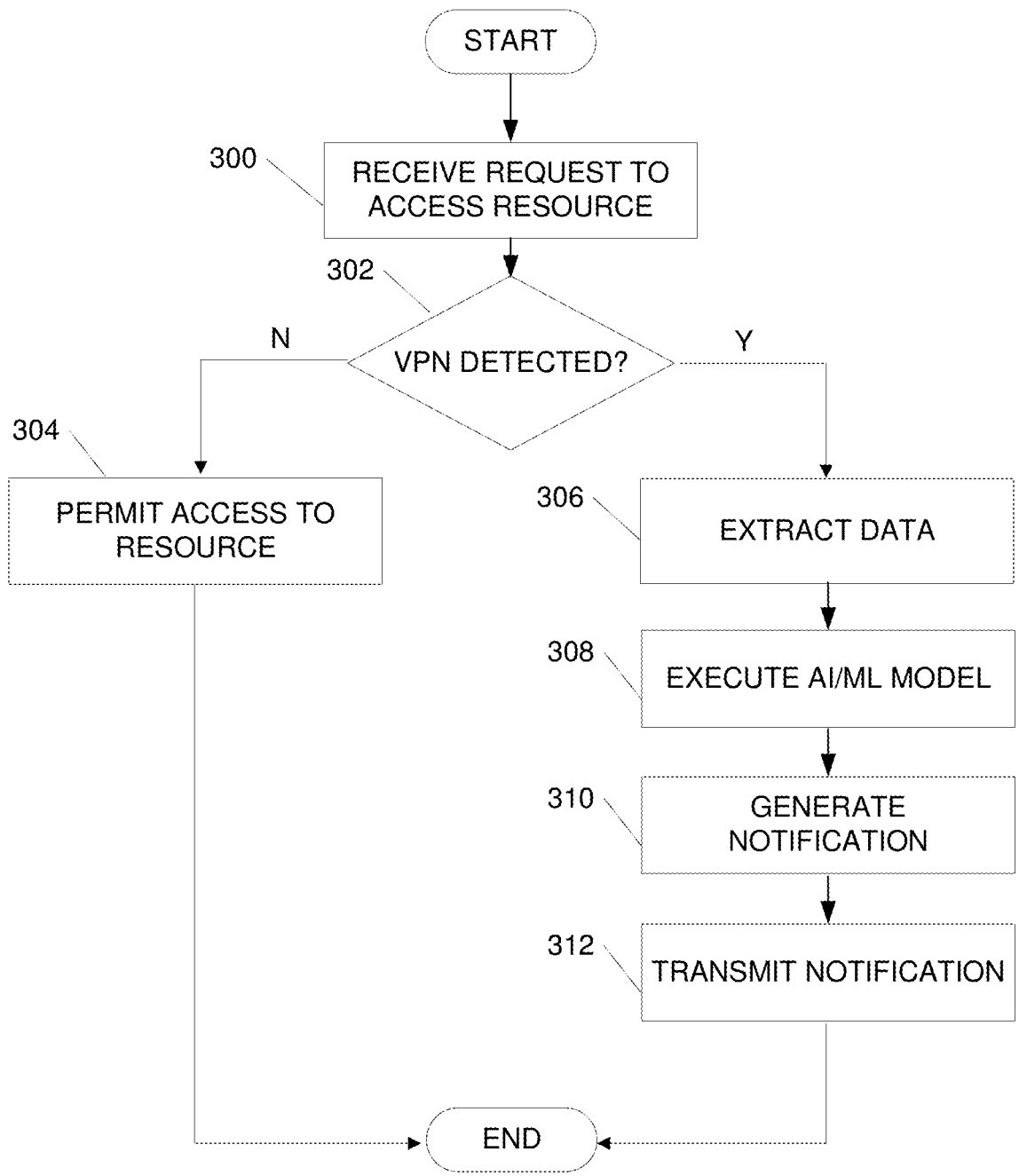
FIG. 3 depicts an illustrative method for controlling access to secure systems based on VPN detection in accordance with one or more aspects described herein.

FIG. 3 is a flow chart illustrating one example method of VPN detection in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, a computing platform, such as VPN detection computing platform 110, may receive, from a user computing device, a request to access a resource on an enterprise organization network. In some examples, the resource may include a system or application executing on or hosted by a computing system or device, such as internal entity computing system 120.

At step 302, the computing platform may determine whether a VPN is in use by the user computing device. For instance, the computing platform may analyze the internet protocol address of the VPN to determine that a VPN is in use. Additionally or alternatively, the computing platform may detect an intermediary between the user computing device and the enterprise organization network (e.g., an additional "hop" in data transmission).

If, at step 302, a VPN is not detected, the computing platform may permit the user computing device to access the resource on the enterprise organization network at step 304. For instance, the computing platform may enable a connection or communication between the user computing device and the internal entity computing system hosting the resource.

If, at step 302, a VPN is detected, at step 306, the request to access the resource may be denied and data may be extracted from the request to access the resource. For instance, identification of a user requesting access (e.g., based on authentication data or login credentials provided by the user), a type of VPN in use, a type of user computing device being used, and the like, may be extracted from the request to access the resource.

At step 308, the extracted data may be input to an AI/ML model and the model may be executed to generate a customized notification. In some examples, additional inputs may be used, such as a skill level of the user (e.g., based on job or role within the enterprise organization), a history of user requests to access resources while using a VPN, or the like.

At step 310, the computing platform may generate the notification or a user interface including the notification. The notification or interface may include identification of the user requesting access, identification of the resource on the enterprise organization network, and instructions to disable the VPN being used. In some examples, the instructions may be based on the type of VPN and, in some arrangements, may include animated icons or interface elements identifying selections to be made to execute the identified instructions (e.g., animated arrows pointing to selectable options on an interface of the user computing device presented as an overlay, or the like). In some examples, the notification may further include a reference to an earlier request to access the resource when using the VPN.

At step 312, the computing platform may transmit the notification to the user computing device. In some examples, transmitting the notification to the user computing device may cause the user computing device to display the notification on a display of the user computing device.

Accordingly, the arrangements described herein provide increased security when accessing enterprise organization resources by limiting or eliminating the use of VPN, which may mask a true location or internet protocol address of a user. Use of a VPN may anonymize users which may make it difficult to ensure a user requesting access is a valid user.

As discussed herein, the arrangements described not only detect use of a VPN and prevent access to the resource by the user computing device when using the VPN, but also may generate customized notifications to identify the issue for the user (e.g., policy violation based on use of VPN) and provide customized instructions to disable the particular type of VPN being used by the particular type of user computing device. In some examples, AI/ML models (e.g., a generative AI model) may be used to generate customized notifications that may give the appearance of coming from an IT support person at the enterprise organization but may be automatically generated based on various inputs (e.g., type of VPN, type of computing device, user identifier, history of user requests for access, skill level of the user, and the like).

The notifications may, in some examples, include step-by-step instructions to disable the particular VPN being used in that instance. In some examples, a skill level of the user (e.g., based on job or role within the enterprise organization, based on technology in use (e.g., a user with a dedicated VPN may be more tech savvy), or the like) may be used to generate the instructions in order to ensure sufficient detail is provided to the user to instruct the user to disable the VPN. For instance, more tech savvy users might not require detailed instructions but rather, an indication to disable the VPN in the "settings" menu. Alternatively, a less tech savvy user may receive step-by-step instructions and, in some examples, animated icons or interface elements that may overlay the users display or interface to direct the users to the selectable options that can be used to navigate through the process of disabling the VPN.

Further, the use of artificial intelligence to generate the notifications may enable more particular notifications to be provided. For instance, not only will the notification be customized to the user, type of VPN, instructions for that VPN and the like, but the notification generated using AI may also reference earlier attempts to access resources while using a VPN, previous notifications generated and sent to the user, and the like. This level of customization would be difficult or almost impossible without the use of artificial intelligence. The customization aspect may also aid in users being more likely to read and follow the notification, rather than disregard the notification if it is a generic notification. Each notification may be unique to the user and the particular features of the current request, past requests, technology in use, and the like.

In some examples, the notification may be displayed upon the user typing a portal name. For instance, as the user begins to type the portal name, a pop-up notification may be presented indicating that a VPN is detected and has to be disabled to access this portal. Accordingly, the system can provide multiple types of notifications in various scenarios to assist in training the user to disable the VPN before attempting to access the resource.

In some examples, the use of certain VPNs may be entirely blocked by the enterprise organization. For instance, if threat actor data indicates use of a particular VPN or type of VPN is popular with threat actors, an enterprise organization may block all inbound connections via that type of VPN or may redirect users. In some examples, this may be an escalation performed after several users have attempted access via the VPN and/or based on the threat actor data.

Additionally or alternatively, escalation of evaluation of a user associated with one or more attempts to access a resource when using a VPN may be based on additional factors. For example, if the same credentials are used at the same time from the same workstation every workday, that may be a factor to consider in determining that the user is a valid user. However, if different credentials are received from the same workstation on different days, that may indicate a threat actor in attempting to access the system and access may be denied and the issue escalated to an administrator.

While several aspects described herein are discussed in the context of employees accessing enterprise organization resources (e.g., work resources from a persona computing device), aspects described herein may also be used to ensure security for client-side access. For instance, with permission and/or registration of a client user, a VMware client may be downloaded installed or otherwise provided to the client user computing device. The VMware client may act in conjunction with or as the computing platform to detect a VPN, evaluate requests, generate notifications, and the like.

In some examples, a skill level of client users may be determined based on historical data of the user captured with permission of the user.

Figure 7:
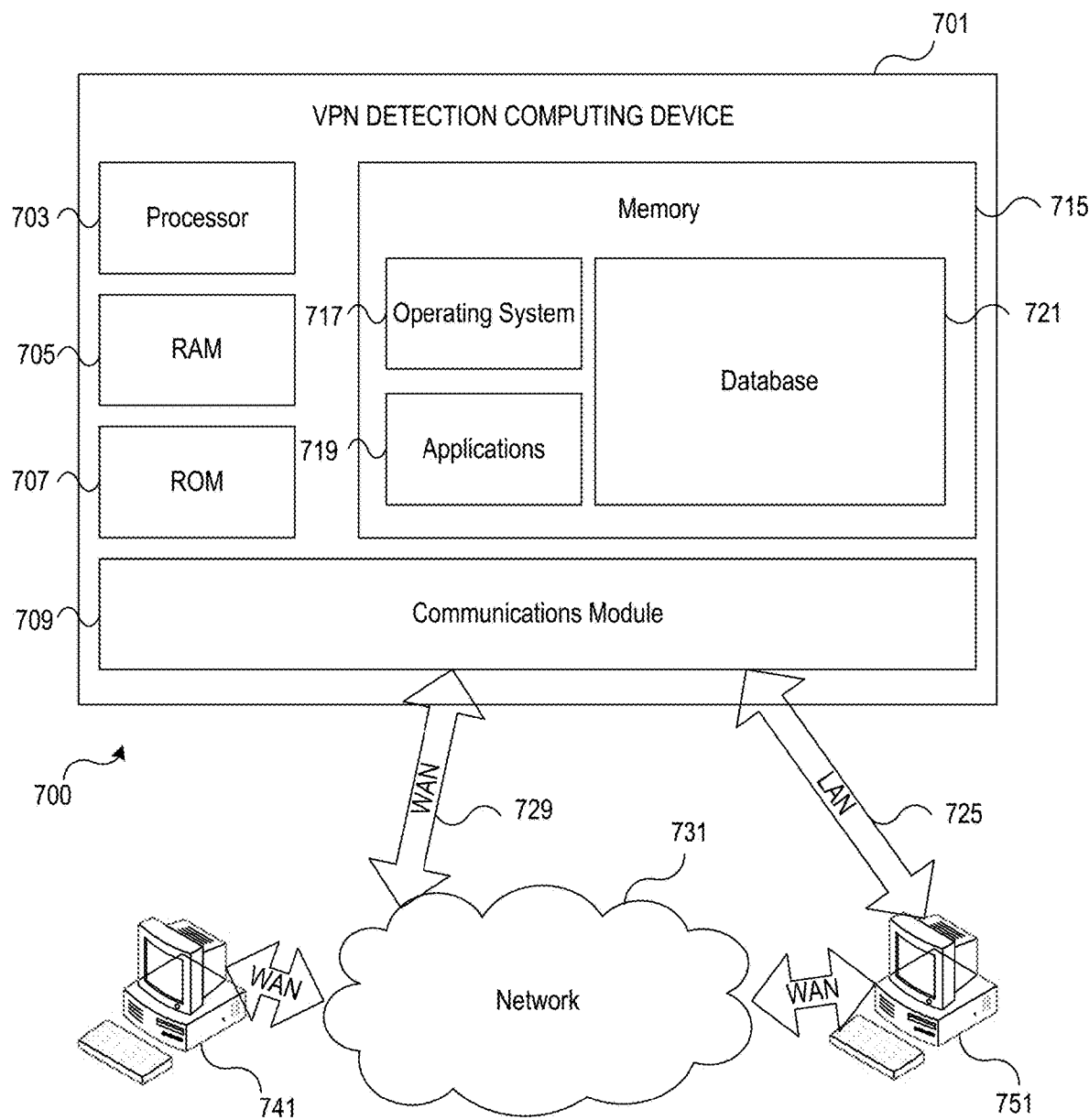
FIG. 7 illustrates one example environment in which various aspects of the disclosure may be implemented in accordance with one or more aspects described herein.

FIG. 7 depicts an illustrative operating environment in which various aspects of the present disclosure may be implemented in accordance with one or more example embodiments. Referring to FIG. 7, computing system environment 700 may be used according to one or more illustrative embodiments. Computing system environment 700 is only one example of a suitable computing environment and is not intended to suggest any limitation as to the scope of use or functionality contained in the disclosure. Computing system environment 700 should not be interpreted as having any dependency or requirement relating to any one or combination of components shown in illustrative computing system environment 700.

Computing system environment 700 may include VPN detection computing device 701 having processor 703 for controlling overall operation of VPN detection computing device 701 and its associated components, including Random Access Memory (RAM) 705, Read-Only Memory (ROM) 707, communications module 709, and memory 715. VPN detection computing device 701 may include a variety of computer readable media. Computer readable media may be any available media that may be accessed by VPN detection computing device 701, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by VPN detection computing device 701.

Although not required, various aspects described herein may be embodied as a method, a data transfer system, or as a computer-readable medium storing computer-executable instructions. For example, a computer-readable medium storing instructions to cause a hardware processor to perform steps of a method in accordance with aspects of the disclosed embodiments is contemplated. For example, aspects of method steps disclosed herein may be executed on a processor on VPN detection computing device 701. Such a processor may execute computer-executable instructions stored on a computer-readable medium.

Software may be stored within memory 715 and/or storage to provide instructions to processor 703 for enabling VPN detection computing device 701 to perform various functions as discussed herein. For example, memory 715 may store software used by VPN detection computing device 701, such as operating system 717, application programs 719, and associated database 721. Also, some or all of the computer executable instructions for VPN detection computing device 701 may be embodied in hardware or firmware. Although not shown, RAM 705 may include one or more applications representing the application data stored in RAM 705 while VPN detection computing device 701 is on and corresponding software applications (e.g., software tasks) are running on VPN detection computing device 701.

Communications module 709 may include a microphone, keypad, touch screen, and/or stylus through which a user of VPN detection computing device 701 may provide input, and may also include one or more of a speaker for providing audio output and a video display device for providing textual, audiovisual and/or graphical output. Computing system environment 700 may also include optical scanners (not shown).

VPN detection computing device 701 may operate in a networked environment supporting connections to one or more other computing devices, such as computing device 741 and 751. Computing devices 741 and 751 may be personal computing devices or servers that include any or all of the elements described above relative to VPN detection computing device 701.

The network connections depicted in FIG. 7 may include Local Area Network (LAN) 725 and Wide Area Network (WAN) 729, as well as other networks. When used in a LAN networking environment, VPN detection computing device 701 may be connected to LAN 725 through a network interface or adapter in communications module 709. When used in a WAN networking environment, VPN detection computing device 701 may include a modem in communications module 709 or other means for establishing communications over WAN 729, such as network 731 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   a memory storing computer-readable instructions that, when executed by the at least one processor, cause the computing platform to:
   receive, from a user computing device, a request to access a resource on an enterprise organization network;
   detect, based on the request, use of a virtual private network (VPN) by the user computing device;

responsive to detecting use of the VPN, extract, from the request to access the resource on the enterprise organization network, information identifying a user associated with the user computing device, a type of VPN and a type of the user computing device;
input, into an artificial intelligence model, the type of VPN and the type of the user computing device;
execute the artificial intelligence model to output a customized notification, wherein the customized notification includes:
identification of the user associated with the user computing device,
identification of the resource on the enterprise organization network, and
instructions to disable the VPN used; and
transmit, to the user computing device, the customized notification, wherein transmitting the customized notification causes display of the customized notification by a display of the user computing device.

2. The computing platform of claim 1, wherein use of the VPN is detected based on an internet protocol address of the VPN.

3. The computing platform of claim 1, wherein use of the VPN is detected based on identification of an intermediary between the user computing device and the enterprise organization network.

4. The computing platform of claim 1, further including instructions that, when executed, cause the computing platform to:
prior to executing the artificial intelligence model, input, to the artificial intelligence model, a history of requests by the user to access resources on the enterprise organization network when using a VPN and a skill level of the user.

5. The computing platform of claim 4, wherein the skill level is based on a role of the user within the enterprise organization.

6. The computing platform of claim 1, wherein the customized notification is further customized to include a reference to an earlier request to access the resource on the enterprise organization network when using the VPN.

7. The computing platform of claim 1, wherein the instructions to disable the VPN are based on the type of the VPN.

8. The computing platform of claim 1, wherein the customized notification further includes animated icons identifying selections to be made to execute the instructions to disable the VPN.

9. A method, comprising:
receiving, by a computing platform, the computing platform having at least one processor and memory, and from a user computing device, a request to access a resource on an enterprise organization network;
detecting, by the at least one processor and based on the request, use of a virtual private network (VPN) by the user computing device;
responsive to detecting use of the VPN, extracting, by the at least one processor and from the request to access the resource on the enterprise organization network, information identifying a user associated with the user computing device, a type of VPN and a type of the user computing device;
inputting, by the at least one processor and into an artificial intelligence model, the type of VPN and the type of the user computing device;
executing, by the at least one processor, the artificial intelligence model to output a customized notification, wherein the customized notification includes:
identification of the user associated with the user computing device,
identification of the resource on the enterprise organization network, and
instructions to disable the VPN used; and
transmitting, by the at least one processor and to the user computing device, the customized notification, wherein transmitting the customized notification causes display of the customized notification by a display of the user computing device.

10. The method of claim 9, wherein use of the VPN is detected based on an internet protocol address of the VPN.

11. The method of claim 9, wherein use of the VPN is detected based on identification of an intermediary between the user computing device and the enterprise organization network.

12. The method of claim 9, further including:
prior to executing the artificial intelligence model, inputting, by the at least one processor and to the artificial intelligence model, a history of requests by the user to access resources on the enterprise organization network when using a VPN and a skill level of the user.

13. The method of claim 12, wherein the skill level is based on a role of the user within the enterprise organization.

14. The method of claim 9, wherein the customized notification is further customized to include a reference to an earlier request to access the resource on the enterprise organization network when using the VPN.

15. The method of claim 9, wherein the instructions to disable the VPN are based on the type of the VPN.

16. The method of claim 9, wherein the customized notification further includes animated icons identifying selections to be made to execute the instructions to disable the VPN.

17. One or more non-transitory computer-readable media storing instructions that, when executed by a computing platform comprising at least one processor, memory, and a communication interface, cause the computing platform to:
receive, from a user computing device, a request to access a resource on an enterprise organization network;
detect, based on the request, use of a virtual private network (VPN) by the user computing device;
responsive to detecting use of the VPN, extract, from the request to access the resource on the enterprise organization network, information identifying a user associated with the user computing device, a type of VPN and a type of the user computing device;
input, into an artificial intelligence model, the type of VPN and a type of the user the computing device;
execute the artificial intelligence model to output a customized notification, wherein the customized notification includes:
identification of the user associated with the user computing device,
identification of the resource on the enterprise organization network, and
instructions to disable the VPN used; and
transmit, to the user computing device, the customized notification, wherein transmitting the customized notification causes display of the customized notification by a display of the user computing device.

18. The one or more computer-readable media of claim 17, wherein use of the VPN is detected based on identification of an intermediary between the user computing device and the enterprise organization network.

19. The one or more non-transitory computer-readable media of claim 17, further including instructions that, when executed, cause the computing platform to:
   prior to executing the artificial intelligence model, input, to the artificial intelligence model, a history of requests by the user to access resources on the enterprise organization network when using a VPN and a skill level of the user.

20. The one or more non-transitory computer-readable media of claim 17, wherein the instructions to disable the VPN are based on the type of the VPN.

\* \* \* \* \*